US010248828B2

(12) United States Patent
Vincent

(10) Patent No.: US 10,248,828 B2
(45) Date of Patent: Apr. 2, 2019

(54) WEARABLE DEVICE HAVING A FINGERPRINT SENSOR

(71) Applicant: ARM IP LIMITED, Cambridge (GB)

(72) Inventor: Hugo John Martin Vincent, Cambridge (GB)

(73) Assignee: ARM IP Limited, Cambridge (GB)

(*) Notice: Subject to any disclaimer, the term of this patent is extended or adjusted under 35 U.S.C. 154(b) by 0 days.

(21) Appl. No.: 15/318,423

(22) PCT Filed: Jun. 12, 2015

(86) PCT No.: PCT/GB2015/051732
§ 371 (c)(1),
(2) Date: Dec. 13, 2016

(87) PCT Pub. No.: WO2015/189633
PCT Pub. Date: Dec. 17, 2015

(65) Prior Publication Data
US 2017/0124371 A1 May 4, 2017

(30) Foreign Application Priority Data
Jun. 13, 2014 (GB) .................................. 1410581.1

(51) Int. Cl.
G06K 9/00 (2006.01)
G06F 3/044 (2006.01)
(52) U.S. Cl.
CPC ....... *G06K 9/0002* (2013.01); *G06K 9/00087* (2013.01); *G06F 3/044* (2013.01)
(58) Field of Classification Search
None
See application file for complete search history.

(56) References Cited

U.S. PATENT DOCUMENTS

2002/0138767 A1* 9/2002 Hamid ................... G06Q 10/02
726/5
2012/0105081 A1 5/2012 Shaikh et al.
(Continued)

FOREIGN PATENT DOCUMENTS

WO WO 03/021523 3/2003
WO WO 2014/171751 10/2014

OTHER PUBLICATIONS

International Search Report for PCT/GB2015/051732 dated Sep. 1, 2015, 3 pages.
(Continued)

*Primary Examiner* — Fred H Hu
(74) *Attorney, Agent, or Firm* — Nixon & Vanderhye P.C.

(57) ABSTRACT

A device worn by a user has a device body providing a first surface that is located adjacent to skin of the user when the device is being worn. Fingerprint sensor circuitry on the device comprises a capacitive fingerprint sensor and associated control circuitry, a primary impedance path being established between electrodes of the capacitive fingerprint sensor when a user places a finger on the capacitive fingerprint sensor. The associated control circuitry passes an AC drive signal through the capacitive fingerprint sensor in order to measure a property whose value varies as a function of impedance. A body ground connection provided by the device body is arranged such that when the user touches the fingerprint sensor, a parasitic impedance path is established from the finger through the body of the user and via the first surface of the device body to the body ground connection. To avoid this parasitic impedance path having the potential to adversely affect the accuracy of the fingerprint sensing operation, the device further comprises filter circuitry between the body ground connection and the electrical ground connection which decouples the body ground connection from the electrical ground connection in a first (Continued)

frequency range including the frequency of the AC drive signal, whilst coupling the body ground connection to the electrical ground connection in at least one further frequency range.

9 Claims, 5 Drawing Sheets

(56) References Cited

U.S. PATENT DOCUMENTS

2013/0187664 A1* 7/2013 Deumal Herraiz .... G01D 18/00
324/548
2014/0270417 A1 9/2014 Lin

OTHER PUBLICATIONS

Search Report for GB1410581.1 dated Dec. 2, 2014, three pages.
International Preliminary Report on Patentability dated Dec. 22, 2016 in PCT/GB2015/051732, 7 pages.

* cited by examiner

WEARABLE DEVICE HAVING A FINGERPRINT SENSOR

This application is the U.S. national phase of International Application No. PCT/GB2015/051732 filed 12 Jun. 2015 which designated the U.S. and claims priority to GB Patent Application No. 1410581.1 filed Jun. 13, 2014, the entire contents of each of which are hereby incorporated by reference.

The present technology relates to a wearable device having a fingerprint sensor.

There are a variety of devices that are configured to be worn by a user when in operation, one example being a watch style of device worn on the wrist of a user. When such a device is worn by a user, the device body will typically have a first surface that is located adjacent (e.g. in direct contact with) the skin of the user.

It is been found desirable to provide a fingerprint sensor on such a device, as a mechanism for allowing the device to be authenticated with the user, such that that device can then only be used by a particular user to which that device has been provided.

There are a number of known types of fingerprint sensor. One type of fingerprint sensor is an optical fingerprint sensor, which effectively captures an image of the fingerprint of the user and compares it with a stored image. However, due to the relatively small size of devices that are configured to be worn by a user when in operation, it is often impractical to provide an optical fingerprint sensor on such devices.

Another type of fingerprint sensor which can be produced in a relatively small size, and hence is suitable for provision on a device configured to be worn by a user, is a capacitive fingerprint sensor. When using a capacitive fingerprint sensor, the finger of the user is placed across a pair of electrodes, an alternating current (AC) drive signal is then provided to one of those electrodes (referred to as a drive electrode), and a measure of that AC signal as present at the other electrode (referred to as the measurement electrode) is then taken. This gives a measure of the impedance provided by the skin. A linear array of such electrodes can be provided, with the finger end being swiped across that array, in order to take a series of impedance-related measurements used to evaluate the fingerprint of the user.

Whilst such a capacitive fingerprint sensor can provide a space efficient solution for detecting a fingerprint of a user in a wearable device, the inventor of the present techniques has identified that in many practical implementations, the fact that the device is worn by the user in operation can give rise to the presence of a parasitic impedance path from the finger through the body of the user and back to the body of the worn device via the surface of the device adjacent to the user's skin, and the impedance of this parasitic impedance path can be low enough to significantly affect the accuracy of the measurements taken by the capacitive fingerprint sensor.

Viewed from a first aspect, there is provided a device configured to be worn by a user when in operation, comprising: a device body having a first surface located adjacent to skin of a user when the device is worn by the user; and fingerprint sensor circuitry comprising a capacitive fingerprint sensor and associated control circuitry, the capacitive fingerprint sensor having electrodes between which a primary impedance path is established when a user places a finger on the capacitive fingerprint sensor, the associated control circuitry being connected to an electrical ground connection and configured to pass an AC drive signal through the capacitive fingerprint sensor when a user places said finger on the capacitive fingerprint sensor in order to measure a property whose value varies as a function of impedance; the device body providing a body ground connection; the body ground connection being arranged such that when the user places said finger on the capacitive fingerprint sensor, a parasitic impedance path is established from the finger through the body of the user and via said first surface of the device body to the body ground connection; the device further comprising filter circuitry between the body ground connection and the electrical ground connection and configured to decouple the body ground connection from the electrical ground connection in a first frequency range including the frequency of the AC drive signal, and configured to couple the body ground connection to the electrical ground connection in at least one further frequency range.

The device provides an electrical ground connection to which circuitry within the device is typically connected. In addition, a body ground connection will also be present within the device. Often, in prior known devices, the electrical ground connection is connected to the body ground connection. For example, when the body ground connection is provided by a metallic casing, connection of the electrical ground connection to the body ground connection will allow shielding to take place in accordance with Faraday cage principles, thereby preventing the device from emitting unwanted signals.

The present device incorporates fingerprint sensor circuitry comprising a capacitive fingerprint sensor and associated control circuitry. When a user places his/her finger over electrodes of the capacitive fingerprint sensor and an AC drive signal is passed through the capacitive fingerprint sensor, a property whose value varies with impedance can be measured to obtain an indication of the impedance over a primary impedance path between the electrodes. The property measured will vary dependent on embodiment, and hence in one embodiment the impedance could be measured directly whilst in another embodiment a property such as voltage could be measured, the value of the voltage varying with impedance between the electrodes.

However, that due to the device being worn at the time the fingerprint sensor is operating, a parasitic impedance path may be established from the finger through the body of the user and via the first surface of the device body to the body ground connection. This is particularly problematic when the body ground connection is close to the user's skin, such as for example would be the case if the first surface of the body is either connected to/providing the body ground connection, or is in close proximity to the body ground connection, since the parasitic impedance path may then be found to have a relatively low impedance when compared with the impedance of the primary impedance path. If the parasitic impedance path were connected to the electrical ground connection, this could significantly adversely affect the accuracy of the fingerprint sensor.

In order to avoid this parasitic impedance path adversely impacting the accuracy of the operation of the fingerprint sensor, the present techniques provide filter circuitry between the body ground connection and the electrical ground connection which is configured to decouple the body ground connection from the electrical ground connection in a first frequency range including the frequency of the AC drive signal, and which is configured to couple the body ground connection to the electrical ground connection in at least one further frequency range.

By decoupling the body ground connection from the electrical ground connection in the first frequency range, this ensures that the parasitic impedance path does not have a low impedance route back to the electrical ground connection, and accordingly removes a potential shorting path that could otherwise attenuate the AC drive signal passing through the fingerprint sensor circuitry to such an extent that the accuracy of the fingerprint sensing operation is compromised.

In one embodiment, the filter circuitry is arranged to decouple the body ground connection from the electrical ground connection by providing a high impedance path between the body ground connection and the electrical ground connection for signals within the first frequency range. Similarly, the filter circuitry may be arranged to couple the body ground connection to the electrical ground connection by providing a low impedance path between the body ground connection and the electrical ground connection for signals within said at least one further frequency range.

In one embodiment, the first surface of the device body is conductive, and accordingly will provide a direct conductive path to the skin of the user if the first surface physically contacts the skin. It can also provide a weaker conductive path to the skin even if the first surface is separated from the skin, for example by a thin item of clothing. In many implementations, there are benefits to be realised from making the first surface of the device body conductive. For example, if the device includes monitoring circuits to monitor whether the device is still attached to the user, so that authentication based on the fingerprint sensor can be removed if the device is taken off, making the first surface of the device body conductive allows for monitoring mechanisms to be provided that electrically couple signals into the body in order to detect whether the device is still connected to the body. However, when the first surface of the device body is conductive, this increases the likelihood that the earlier mentioned parasitic impedance path will adversely affect the accurate operation of the fingerprint sensor, and accordingly represents an embodiment where the use of the filter circuitry of the present techniques is particularly beneficial, in order to significantly reduce/remove the effect of the parasitic impedance path.

In one particular embodiment, the first surface is metallic.

Whilst the first surface may in one embodiment be provided solely by one surface of a housing of the device, in another embodiment the device body includes not only the housing but also a conductive strap used to attach the device to the user. In such embodiments, it will be appreciated that the first surface of the device body has a relatively large area, improving the conduction characteristics. This is hence another embodiment where the use of the filter circuitry of the present techniques is particularly beneficial, since absent the use of such filter circuitry the parasitic impedance path will have a relatively low impedance that could significantly affect the accuracy of the fingerprint sensor operation.

As mentioned earlier, the adverse effects potentially introduced by the parasitic impedance path are particularly significant when the body ground connection is close to the user's skin. In one particular embodiment, the body ground connection is provided by the first surface. Hence, in such embodiments, the use of the filter circuitry is particularly beneficial.

The filter circuitry can take a variety of forms, provided that it serves to effectively decouple the body ground connection from the electrical ground connection within a frequency range including the frequency of the AC drive signal. In one embodiment this may be in the range of approximately 60 kHz-80 kHz. In one particular embodiment, the filter circuitry comprises band stop filter circuitry, and the at least one further frequency range for which the filter circuitry effectively couples the body ground connection to the electrical ground connection comprises a second frequency range higher than said first frequency range and a third frequency range lower than said first frequency range.

The second frequency range will in one embodiment be set to incorporate a range of high frequencies that are to be shielded, so that signals at those frequencies are not emitted from the device. Further, in one embodiment the third frequency range will incorporate frequencies of various signals employed within the circuitry of the device, where coupling of the electrical ground connection to the body ground connection is required for correct operation (for example due to an antenna being proximal to the body and the body acting as a ground plane). One particular example would be a touch sensor incorporated into the device, and consisting of a capacitive element that is charged and discharged at a frequency that is dependent on whether the sensor is being touched by the user or not, hence enabling a detection of whether the user is touching the touch sensor or not.

Due to the fact that in accordance with embodiments the electrical ground connection is effectively decoupled from the body ground connection for a certain range of frequencies, there is a possibility that the circuits within the device could be susceptible to damage by electrostatic discharge. In order to alleviate this problem, in one embodiment the device further comprises electrostatic discharge protection circuitry configured in parallel with the filter circuitry between said body ground connection and said electrical ground connection. In one particular embodiment, the electrostatic discharge protection circuitry is formed by a pair of back-to-back Zener diodes.

Viewed from a second aspect, there is provided a device configured to be worn by a user when in operation, comprising: a device body having first surface means for locating adjacent to skin of a user when the device is worn by the user; and a fingerprint sensor comprising a capacitive fingerprint sensor means and associated control means, the capacitive fingerprint sensor means for providing electrodes between which a primary impedance path is established when a user places a finger on the capacitive fingerprint sensor means, the associated control means for connecting to an electrical ground connection and for passing an AC drive signal through the capacitive fingerprint sensor means when a user places said finger on the capacitive fingerprint sensor means in order to measure a property whose value varies as a function of impedance; the device body providing a body ground connection; the body ground connection being arranged such that when the user places said finger on the capacitive fingerprint sensor means, a parasitic impedance path is established from the finger through the body of the user and via said first surface means of the device body to the body ground connection; the device further comprising filter means between the body ground connection and the electrical ground connection for decoupling the body ground connection from the electrical ground connection in a first frequency range including the frequency of the AC drive signal, and for coupling the body ground connection to the electrical ground connection in at least one further frequency range.

Viewed from a third aspect there is provided a method of detecting a fingerprint of a user by a device configured to be worn by the user when in operation, the device having a first surface located adjacent to skin of a user when the device is worn by the user, and fingerprint sensor circuitry comprising a capacitive fingerprint sensor and associated control circuitry, the method comprising: establishing a primary impedance path between electrodes of the capacitive fingerprint sensor when a user places a finger on the capacitive fingerprint sensor; connecting the associated control circuitry to an electrical ground connection and issuing an AC drive signal from the associated control circuitry and through the capacitive fingerprint sensor when a user places said finger on the capacitive fingerprint sensor in order to measure a property whose value varies as a function of impedance; providing a body ground connection which is arranged such that when the user places said finger on the capacitive fingerprint sensor, a parasitic impedance path is established from the finger through the body of the user and via said first surface of the device body to the body ground connection; and employing filter circuitry between the body ground connection and the electrical ground connection in order to decouple the body ground connection from the electrical ground connection in a first frequency range including the frequency of the AC drive signal, and in order to couple the body ground connection to the electrical ground connection in at least one further frequency range.

The present techniques will be described further, by way of example only, with reference to embodiments thereof as illustrated in the accompanying drawings, in which:

FIG. 1 is a diagram illustrating a wearable device incorporating a fingerprint sensor, in accordance with one embodiment;

FIG. 2A schematically illustrates the arrangement of the fingerprint sensor in accordance with one embodiment;

FIG. 2B illustrates the establishment of a primary impedance path when a user's finger is placed on the fingerprint sensor in accordance with one embodiment;

FIG. 3 schematically illustrates a parasitic impedance path that may be established when the fingerprint sensor is used whilst the device is worn by the user;

Figure 1:
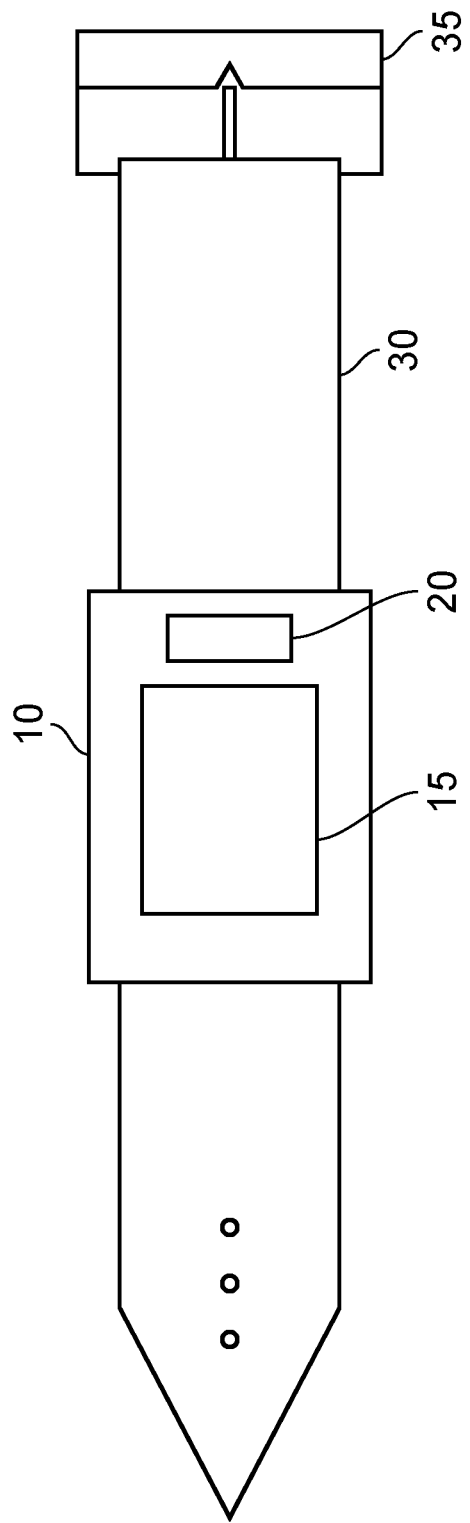

FIG. 1 schematically illustrates a wearable device in accordance with one embodiment. In this particular embodiment, the wearable device is a watch-style device including a housing 10 connected to a watch strap 30 including a clasp 35 to enable the watch to be attached to the wrist of a user via the watch strap. The housing 10 includes a display 15 for displaying a variety of information to the user, along with a fingerprint sensor 20 which may be used to authenticate the watch to the user.

In particular, when the user puts the watch on his/her wrist, the user can then place a finger on the fingerprint sensor 20 in order to authenticate that he/she is the registered user of the watch. If the fingerprint sensed by the fingerprint sensor matches a stored fingerprint, then the functions of the watch will be made available to the user, whereas otherwise the user will not be allowed to use at least some of the functions of the watch.

Figure 2A:
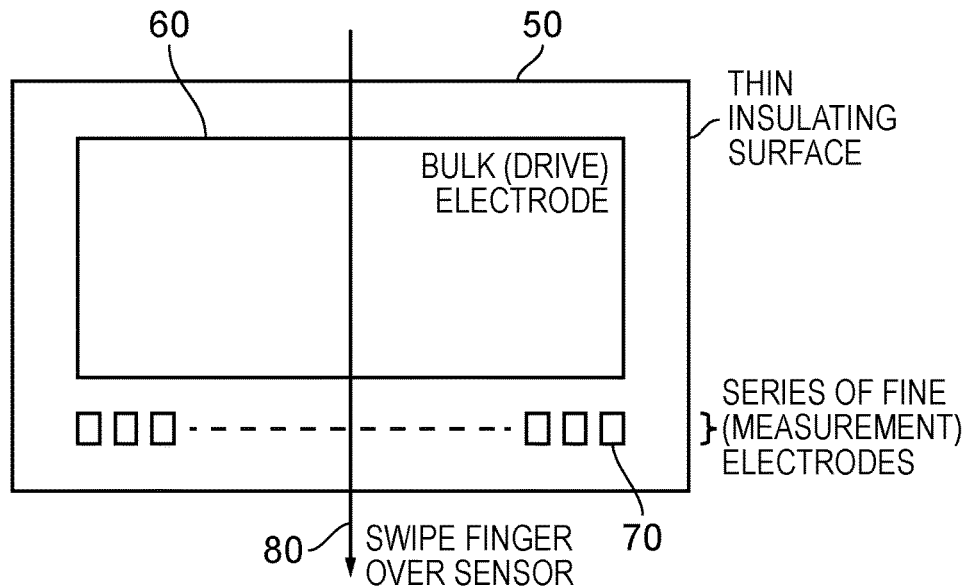

In one embodiment, the fingerprint sensor takes the form of a capacitive fingerprint sensor, and one example layout of such a capacitive fingerprint sensor is shown in FIG. 2A. In particular, under a thin insulating surface 50, a bulk electrode 60 may be provided, the bulk electrode being arranged to receive a drive signal from associated control circuitry of the fingerprint sensor, and accordingly also being referred to herein as the drive electrode.

A linear array of fine electrodes 70 is also provided under the thin insulating surface 50, these also being referred to herein as the measurement electrodes for reasons that will become apparent from the discussion of FIG. 2B below. In use, the user swipes their finger over the sensor in the direction indicated by the sensor 80 (or in the opposite direction), and a series of measurements are taken by the linear array of measurement electrodes 70 in order to build up an image of the fingerprint of the user.

Whilst FIG. 2A illustrates one particular arrangement of the drive electrode and measurement electrodes, it will be appreciated that a number of alternative configurations could be provided. For example, the drive electrode could be provided as a ring surrounding the measurement electrodes, could be provided above or below the measurement electrodes, or could indeed be provided by the body of the device in some instances.

Figure 2B:
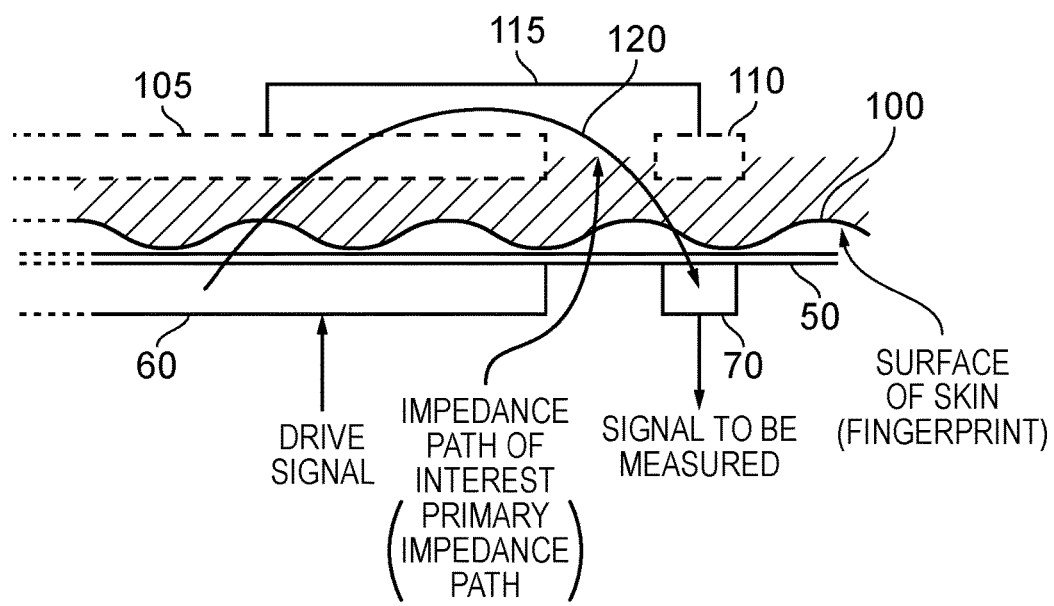

FIG. 2B is a cross-sectional view through the capacitive fingerprint sensor along the line 80 shown in FIG. 2A. As shown in FIG. 2B, when the user places their finger over the fingerprint sensor, certain parts of the surface 100 of the finger will touch the thin insulating surface 50 but other parts will not, due to the undulations on the skin surface 100 caused by the fingerprint. The skin of the finger is partially conducting, and beneath the skin the body is relatively highly conductive and hence can be viewed as providing a conductive path 115. The region of the finger over the relatively large drive electrode 60 effectively provides an opposing electrode 105 to the electrode 60, thereby establishing a first capacitor. Similarly, the portion of the finger above the fine electrode 70 also effectively provides an electrode 110, establishing a second capacitor between the electrode 110 and the fine electrode 70.

Due to the relatively large area of the first capacitor formed by the electrodes 60, 105, perturbations in the skin surface are averaged out for that capacitor, such that a relatively constant capacitance is provided by that first capacitor. However, the same is not true of the much smaller second capacitor formed by the electrodes 70, 110, and the capacitance of that capacitor will vary significantly dependent on the relative height of the skin surface above the electrode 70 in the gap between the electrodes 70, 110.

The presence of these two capacitors establishes an impedance path of interest 120 (also referred to herein as the primary impedance path), with the signal measured at the output of the electrode 70 being an attenuated version of the input drive signal to the electrode 60. Provided the primary impedance path 120 is the only significant impedance path present, then it will be appreciated that the signal measured will vary as the impedance over the primary impedance path varies.

Since capacitance increases as the area of the electrodes increases, then it will be understood that the first capacitor formed by the electrodes 60, 105 will have a significantly higher capacitance than the second capacitor formed by the electrodes 70, 110. The higher the capacitance, then the lower the impedance, and accordingly it will be appreciated that variations in the impedance of the primary impedance path 120 will be dominated by variations in impedance of the second capacitor formed by the electrodes 70, 110. Further, the capacitance increases as the distance between the plates of a capacitor reduce. The effective distance between the electrodes 70, 110 of the second capacitor depends on the proportion of the gap that is filled with air and the proportion that is filled with skin of the user's finger. Since air is a greater dielectric than skin, then the more air that there is in the gap between the electrode 70, 110, the more the effective distance between the electrodes 70, 110, and hence the lower the capacitance. This in turn means that the impedance will increase as the amount of air between the electrodes increases.

In summary therefore, due to the measurement capacitor formed by the electrodes 70, 110 being the dominant contributor to the overall impedance of the primary impedance path, and due to the impedance varying dependent on the height of the skin surface above the electrode 70, it will be appreciated that by measuring the signal output from the electrode 70 for a whole series of positions of the finger over the fingerprint sensor as the finger is swiped in the direction 80, this enables a 2D profile of the surface contours of the skin to be established in the direction 80. When combined with the linear array of sensors 70, this enables a 3D image of the contours of the finger, and hence the overall fingerprint, to be determined.

Figure 3:
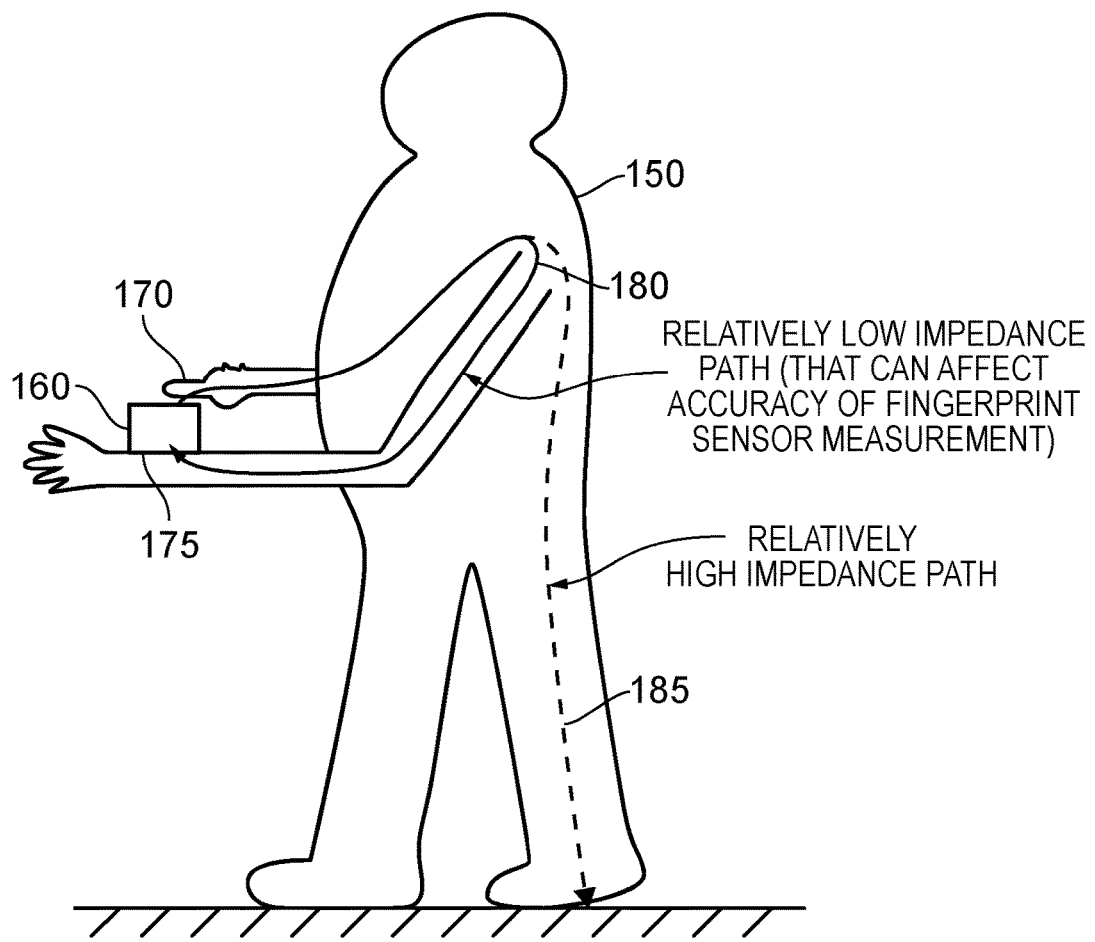

As illustrated in FIG. 3, a number of parasitic impedance paths may be produced. A commonly understood impedance path is the impedance path 185 shown extending from the user's finger 170 down to the ground upon which the user 150 is standing. However, this typically has a relatively high impedance when compared with the impedance of the primary impedance path, and accordingly does not adversely affect the accuracy of the measurements taken by the fingerprint sensor. However, due to the device (illustrated schematically by the box 160 in FIG. 3) being worn by the user at the time the fingerprint sensor operation is being performed, a second parasitic path can be established from the finger through the body of the user and via a surface of the device 160 contacting the user's wrist, in order to make a connection with a body ground connection provided within the device body 160.

This is particularly problematic when the body ground connection is close to the user's skin (in this example the skin of the user on the user's wrist to which the device 160 is attached). In one particular embodiment, both the housing 10 and the strap 30 of the watch are metallic, and the housing of the watch provides the body ground connection. In this instance a relatively large surface area is provided adjacent to the skin of the user at the location on the wrist where the watch is attached, providing a good electrical connection to the user's body. This means that the parasitic impedance path 180 from the finger through the body to the body ground connection will have a relatively low impedance when compared with the impedance of the primary impedance path 120. The impedance of this parasitic impedance path 180 can also be relatively low even if the metallic outer surface of the watch does not directly provide the body ground connection, but the body ground connection is in close proximity to that metallic surface. Further, even if the surface of the watch contacting the wrist is not conductive, if the body ground connection is close to that surface, there can still be a sufficient electrical conduction to give rise to the parasitic conductive path 180 having a relatively low impedance when compared with the impedance of the primary impedance path.

The control circuitry for the fingerprint sensor typically operates from a voltage difference between a supply voltage and an electrical ground connection. If the electrical ground connection were to be connected to the body ground connection (as would often be the case in known electrical devices, in order to provide Faraday cage style shielding effects), then this would provide a low impedance path via the route 180 to the electrical ground connection, and could significantly impact the accuracy of the measurements taken by the fingerprint sensor. In effect, that path 180 shorts the connection line 115 of FIG. 2B to electrical ground via a low impedance path in such situations, and accordingly attenuates the signal significantly prior to it being input to the measurement capacitor formed by the electrodes 70, 110, thereby impacting the accurate operation of the measurement capacitor.

Figure 4:
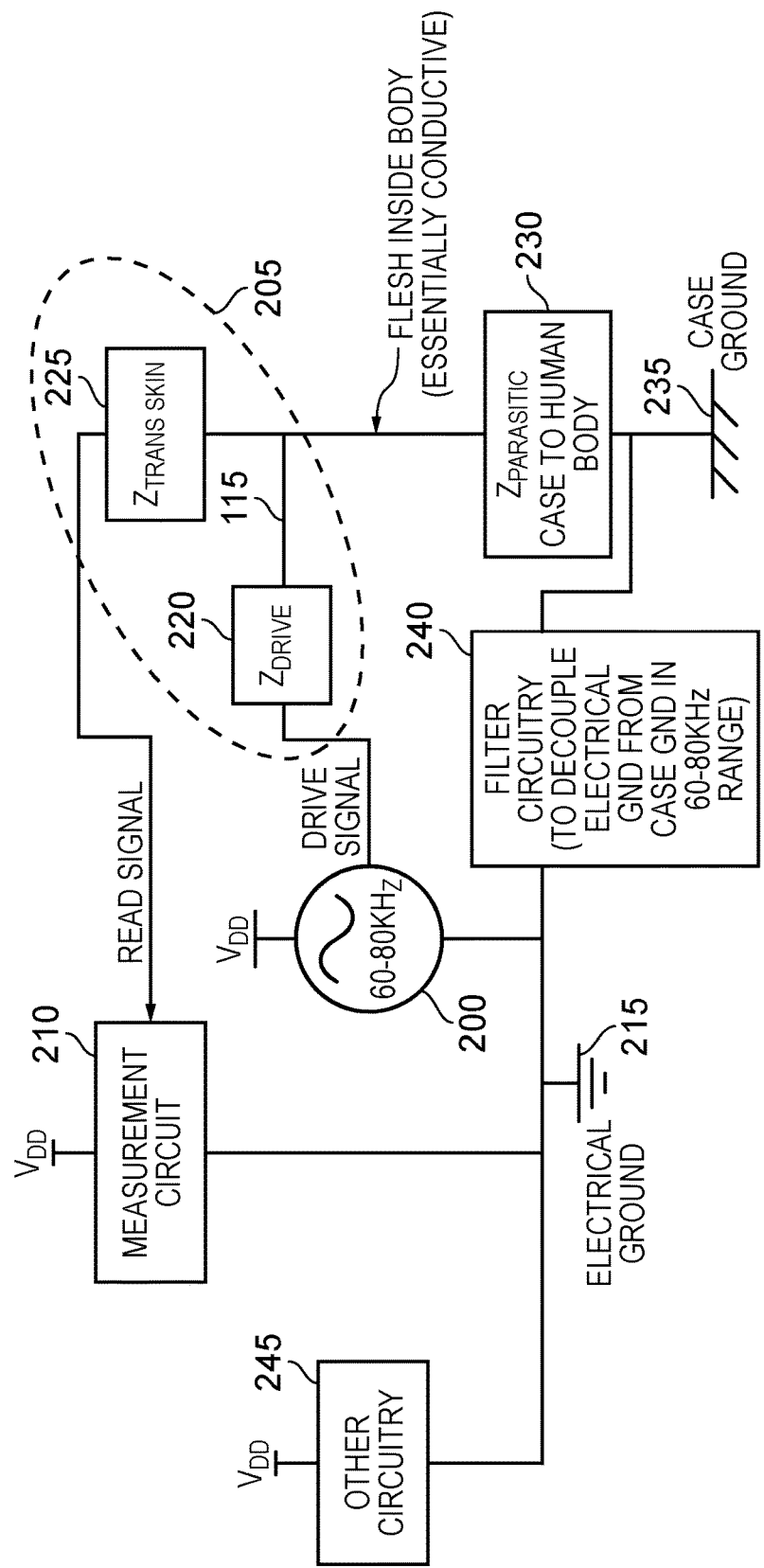
FIG. 4 is a block diagram illustrating circuitry in accordance with one embodiment.

FIG. 4 is a block diagram illustrating how filter circuitry is used in one embodiment in order to decouple the parasitic impedance path from the electrical ground connection, and accordingly alleviate the above problems. As shown, the fingerprint sensor (denoted by the dotted lines 205) has associated control circuitry 200, 210. In particular, the control circuitry includes drive circuitry 200 coupled between a supply voltage and electrical ground 215 in order to generate an AC drive signal, in this embodiment the AC drive signal being at a frequency within the range 60 to 80 KHz. The drive signal is provided to the drive electrode 60, and then the read signal output by the fine electrodes 70 is passed to a corresponding measurement circuit 210, which is also connected between a supply voltage and electrical ground 215. As will be appreciated from FIG. 2A, there will actually be multiple read signals output from the fingerprint sensor 205, one for each separate measurement electrode 70, and a corresponding measurement circuit 210 will typically be provided for each such read signal.

Due to the presence of the two capacitors schematically illustrated in FIG. 2B, two separate impedances will be present within the fingerprint sensor. In particular, the capacitor 220 provided by the bulk electrode 60 and associated electrode 105 will provide an impedance $Z_{DRIVE}$. In addition, the capacitor 225 formed by the fine electrode 70 and associated electrode 110 will present a second impedance $Z_{TRANSSKIN}$. As discussed earlier with reference to FIG. 2B, the conductive path 115 between these two capacitors 220, 225 is due to the conductive nature of the body once the skin has been traversed by the signal.

However, as discussed with reference to FIG. 3, the parasitic impedance path 180 effectively establishes another capacitor 230 extending from inside the body of the user, through the user's skin in the wrist area of the user, and on to the case of the watch that is then connected to the body ground connection 235. Hence, as shown in FIG. 4, this capacitor 230 provides the impedance $Z_{PARASITIC}$, representing an impedance between the case of the watch and the inside of the human body.

If the body ground connection 235 was connected directly to the electrical ground connection 215, this would effectively provide a shorting path from the connection 115 to electrical ground, and significantly affect the accuracy of the operation of the fingerprint sensor. However, as shown in FIG. 4, in accordance with the described embodiment, filter circuitry 240 is located between the electrical ground connection 215 and the body ground connection 235, and the filter circuitry is constructed such that it effectively decouples the electrical ground 215 from the body ground connection 235 in the frequency range of the drive signal generated by the drive circuitry 200. As a result, this removes the possibility of a low impedance path being established via the capacitor 230 to the electrical ground connection 215, thereby ensuring correct and accurate operation of the fingerprint sensor.

Typically there will be one or more other circuits 245 that will also be connected between a supply voltage and the electrical ground connection 215. The manner in which some of these circuits operate may require the electrical ground to be connected to the body ground connection 235. For example, the watch may include a touch sensor formed by a capacitive element that is charged and discharged at a frequency which will vary dependent on whether the touch sensor is being touched by the user or not. Such a circuit may only operate effectively if, for the range of frequencies at which the capacitor may be charged and discharged, the electrical ground connection 215 is connected to the body ground connection 235.

In one embodiment this could be achieved by arranging the filter circuitry as a band stop filter, so that for those frequencies the impedance presented by the filter circuitry is very low. Typically, the frequencies employed by such a touch sensor are much lower than the frequency of the drive circuitry 200, and in one embodiment may be less than 10 kHz, in particular in the order of 250 Hz.

Further, as discussed earlier, to provide required shielding functionality, various high frequencies generated by the circuitry such as the circuitry 245 may need to be prevented from emission from the watch, and this will also require the electrical ground connection 215 to be connected to the body ground connection 235. Again, by arranging the filter circuitry as a band stop filter, this can be achieved, since for high frequencies above the frequency range of the drive signal generated by the drive circuitry 200, the filter circuitry can then be arranged to provide a low impedance, thus effectively connecting the electrical ground 215 to the body ground connection 235 for those frequencies.

Figure 5A:
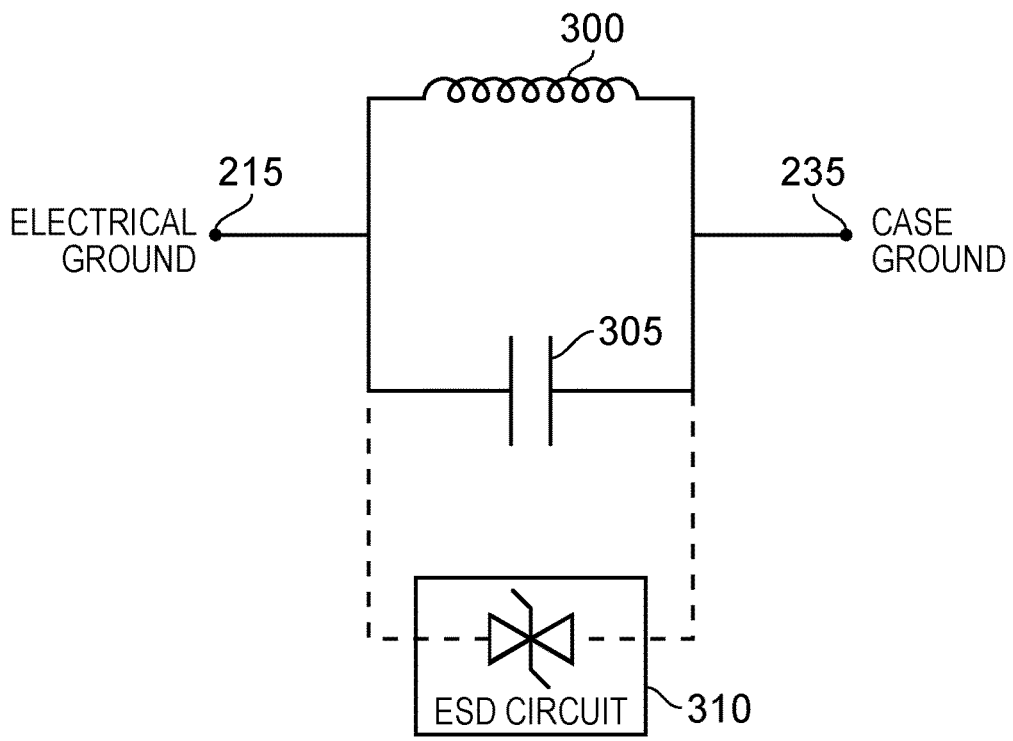
FIG. 5A illustrates the form of the filter circuitry of FIG. 4 in accordance with one embodiment, along with optional electrostatic discharge circuitry.
Figure 5B:
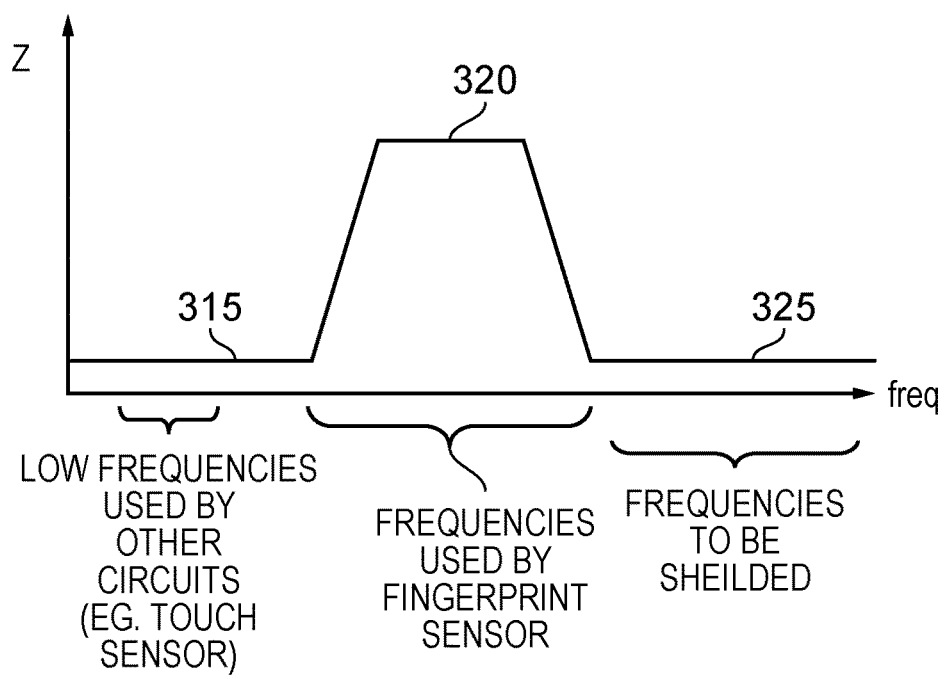
FIG. 5B is a graph showing how the impedance presented by the filter circuitry varies with frequency in accordance with one embodiment.

FIG. 5A illustrates a particular form of band stop filter that can be used for the filter circuitry 240 of FIG. 4. As shown, the band stop filter is constructed by placing an inductor 300 in parallel with a capacitor 305, with the sizing of the inductor 300 and capacitor 305 being selected having regard to the frequency range the band stop filter is to provide a high impedance for. As will be understood, a capacitor will generally provide a low impedance for high frequencies and a higher impedance for low frequencies. Conversely, an inductor will provide a high impedance for higher frequencies, and low impedance for lower frequencies. By sizing the inductor 300 and capacitor 305 appropriately, a profile of impedance such as shown in FIG. 5B can be provided, such that in a low frequency range 315 and a high frequency range 325, the band stop filter provides a low impedance, hence effectively connecting the electrical ground 215 to the case ground 235. However, for an intermediate range of frequencies 320, the band stop filter will provide a high impedance hence effectively decoupling the electrical ground 215 from the case ground 235. For the purposes of the described embodiments, the band stop filter is arranged such that the frequency range 320 incorporates the frequency range at which the drive signal is generated by the drive circuitry 200.

Due to the electrical ground connection 215 being decoupled from the case ground 235 for at least a certain frequency range, there is a possibility that electrostatic discharge could result in damage to at least some of the circuits within the device. To address this problem, an electrostatic discharge circuit 310 can be provided in parallel with the band stop filter, as shown in FIG. 5A. The electrostatic discharge circuit can be formed in a variety of ways, but in one embodiment is formed by a pair of back-to-back Zener diodes.

From the above described embodiments, it will be seen that such embodiments provide a mechanism for reliably using a capacitive fingerprint sensor on a device that is designed to be worn by a user when in operation, and in particular effectively removes a parasitic impedance path that might otherwise reduce the accuracy of the operation of the fingerprint sensor.

Although particular embodiments have been described herein, it will be appreciated that many modifications and additions thereto may be made within the scope of the claims. For example, various combinations of the features of the following dependent claims could be made with the features of the independent claims.

The invention claimed is:

1. A device configured to be worn by a user when in operation, comprising:
a device body having a first surface located adjacent to skin of a user when the device is worn by the user; and
fingerprint sensor circuitry comprising a capacitive fingerprint sensor and associated control circuitry, the capacitive fingerprint sensor having electrodes between which a primary impedance path is established when a user places a finger on the capacitive fingerprint sensor, the associated control circuitry being connected to an electrical ground connection and configured to pass an AC drive signal through the capacitive fingerprint sensor when a user places said finger on the capacitive fingerprint sensor in order to measure a property whose value varies as a function of impedance;
the device body providing a body ground connection which is different from the electrical ground connection;
the body ground connection being arranged such that when the user places said finger on the capacitive fingerprint sensor, a parasitic impedance path is established from the finger through the body of the user and via said first surface of the device body to the body ground connection;
the device further comprising filter circuitry between the body ground connection and the electrical ground connection and configured to decouple the body ground connection from the electrical ground connection in a first frequency range including the frequency of the AC drive signal, and configured to couple the body ground connection to the electrical ground connection in at least one further frequency range, where the first frequency range is different from and lower than one further frequency range of the at least one further frequency range.

2. A device as claimed in claim 1, wherein said first surface is conductive.

3. A device as claimed in claim 2, wherein said first surface is metallic.

4. A device as claimed in claim 2, wherein the device body includes a conductive strap used to attach the device to the user.

5. A device as claimed in claim 2, wherein said body ground connection is provided by said first surface.

6. A device as claimed in claim 1, wherein said filter circuitry comprises band stop filter circuitry, and said at least one further frequency range comprises a second frequency range higher than said first frequency range and a third frequency range lower than said first frequency range.

7. A device as claimed in claim 1, further comprising electrostatic discharge protection circuitry configured in parallel with the filter circuitry between said body ground connection and said electrical ground connection.

8. A device configured to be worn by a user when in operation, comprising:

a device body having a first surface locatable adjacent to skin of a user when the device is worn by the user; and a fingerprint sensor comprising means for sensing a fingerprint and associated means for controlling the means for sensing a fingerprint, the means for sensing a fingerprint having electrodes between which a primary impedance path is established when a user places a finger on the means for sensing a fingerprint, the means for controlling being connected to an electrical ground connection and for passing an AC drive signal through the means for sensing a fingerprint when a user places said finger on the means for sensing a fingerprint in order to measure a property whose value varies as a function of impedance;

the device body providing a body ground connection which is different from the electrical ground connection;

the body ground connection being arranged such that when the user places said finger on the means for sensing a fingerprint, a parasitic impedance path is established from the finger through the body of the user and via said first surface means of the device body to the body ground connection;

the device further comprising means for filtering between the body ground connection and the electrical ground connection for decoupling the body ground connection from the electrical ground connection in a first frequency range including the frequency of the AC drive signal, and for coupling the body ground connection to the electrical ground connection in at least one further frequency range, where the first frequency range is different from and lower than one further frequency range of the at least one further frequency range.

9. A method of detecting a fingerprint of a user by a device configured to be worn by the user when in operation, the device having a first surface located adjacent to skin of a user when the device is worn by the user, and fingerprint sensor circuitry comprising a capacitive fingerprint sensor and associated control circuitry, the method comprising:

establishing a primary impedance path between electrodes of the capacitive fingerprint sensor when a user places a finger on the capacitive fingerprint sensor;

connecting the associated control circuitry to an electrical ground connection and issuing an AC drive signal from the associated control circuitry and through the capacitive fingerprint sensor when a user places said finger on the capacitive fingerprint sensor in order to measure a property whose value varies as a function of impedance;

providing a body ground connection, which is different from the electrical ground connection, and which is arranged such that when the user places said finger on the capacitive fingerprint sensor, a parasitic impedance path is established from the finger through the body of the user and via said first surface of the device body to the body ground connection; and employing filter circuitry between the body ground connection and the electrical ground connection in order to decouple the body ground connection from the electrical ground connection in a first frequency range including the frequency of the AC drive signal, and in order to couple the body ground connection to the electrical ground connection in at least one further frequency range, where the first frequency range is different from and lower than one further frequency range of the at least one further frequency range.

* * * * *